Dec. 30, 1969      W. H. KELM      3,486,401
ADJUSTABLE CUTTING TOOL
Filed Sept. 25, 1967      2 Sheets-Sheet 1

INVENTOR
WALTER H. KELM
BY *Harold J. Holt*
ATTORNEY

Dec. 30, 1969   W. H. KELM   3,486,401
ADJUSTABLE CUTTING TOOL
Filed Sept. 25, 1967   2 Sheets-Sheet 2

INVENTOR
WALTER H. KELM

BY Harold J. Holt
ATTORNEY

Patented Dec. 30, 1969

3,486,401
ADJUSTABLE CUTTING TOOL
Walter H. Kelm, Mount Clemens, Mich., assignor to General Electric Company, a corporation of New York
Filed Sept. 25, 1967, Ser. No. 670,188
Int. Cl. B23b 47/00, 29/02
U.S. Cl. 77—58
4 Claims

ABSTRACT OF THE DISCLOSURE

A boring tool having an end groove within which a transversely slidable cutter head is received, with precision adjustment means for transversely positioning and holding the head relative to the bar end. A wedge, fitted within a socket opening into the end groove, releasably locks the cutter head in position. The adjustment means is in the form of a rotatable screw arranged within a slot formed adjacent the groove. An anti-backlash nut, mounted upon the screw, with a portion extending into the groove and secured to the cutter head, moves the cutter head in response to the rotation of the screw.

BACKGROUND OF THE INVENTION

Conventional boring tools generally consist of a long bar or shank having one end arranged to be secured to the boring machine and an opposite end upon which a cutting tool is mounted. By arranging the cutting end of the tool within an opening in a workpiece, rotation of the workpiece causes the cutting end to cut the workpiece to thereby enlarge the opening.

Conventional boring tools are made in a variety of sizes in order to bore the desired size opening. In order to increase the range of openings to be bored by a single tool, attempts have been made to mount the cutting head adjustably upon the boring bar, thereby permitting varying the size opening to be bored and increasing the range of the tool. However, such adjustable boring bars generally have been difficult to adjust for precision sizing, and in many instances have not been satisfactory for precision cutting.

SUMMARY OF THE INVENTION

Thus, it is an object of this invention to provide an adjustable cutting tool wherein the means for adjusting and holding the cutter head is simple, relatively inexpensive in construction and in operation, and, more importantly, produces precise increments of movement of the cutter head relative to the shank, and eliminates backlash movement between the cutter head and the shank.

More specifically, this invention contemplates the use of a dovetail fit for securely but adjustably mounting the cutter head on the shank. The dovetail fit is formed by an appropriate tapered surface within a groove in the shank and by cooperating tapered surfaces on an extension of the cutter head and on a separate wedge member. Adjustment of the head on the shank or boring bar is by means of a precision adjustment screw within the end of the boring bar. The screw is precisely centered upon rotatable bearings and carries an anti-backlash form of nut which constantly exerts opposing pressures axially upon the screw to thereby eliminate backlash, such nut being connected to the cutter head so that turning the screw a precise amount results in longitudinal movement of the cutter head in a precisely predetermined amount. Tightening of the wedge, fitted into a correspondingly shaped socket located adjacent the cutter head, locks the cutter against movement.

These and other objects and advantages of this invention will become apparent upon reading the following description, of which the attached drawings form a part.

DESCRIPTION OF THE PREFERRED EMBODIMENTS

Figure 1:
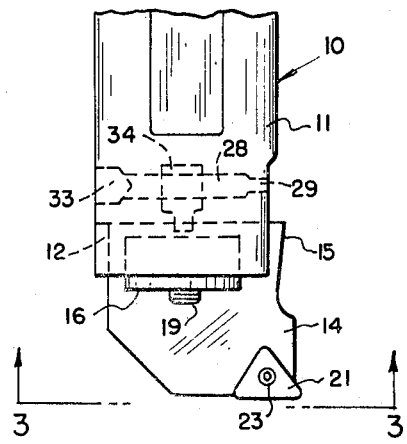
FIGURE 1 is a plan view of the working end of the adjustable boring tool herein.
Figure 2:
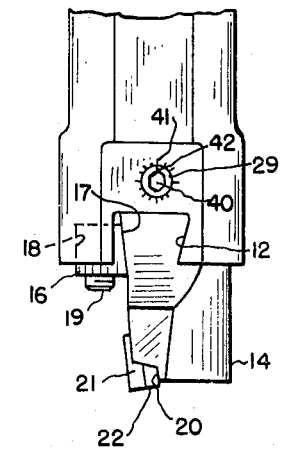
FIGURE 2 is a side elevational view of the boring tool illustrated in FIG. 1.
Figure 3:
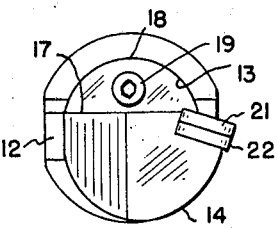
FIGURE 3 is a front elevational view taken in the direction of arrows 3—3 of FIG. 1.

Referring to FIGS. 1–3, the adjustable boring tool 10 is formed of an elongated boring bar or shank 11 having an upper end (not shown) adapted to be fastened to a boring machine and a lower cutter end formed with an open-ended groove 12 having two transverse walls, a first one of which is tapered inwardly toward the open end of the groove. The end of the shank has an approximately semi-circular socket portion 13 laterally opening into the groove and adjacent the second wall thereof.

Figure 4:
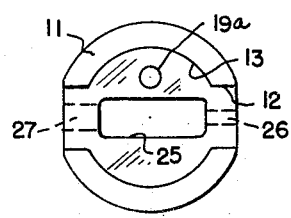
FIGURE 4 is a front elevational view of the boring bar with the head removed.

The cutter head 14 is arranged against the end of the bar and is provided with an integral tongue 15 extending transversely therefrom, formed with inwardly converging tapered side walls, fitted loosely within the groove 12 for removal endwise of the bar. The tongue is clamped securely and immovably in place by means of a wedge 16 shaped complementary to the walls of socket 13 into which it fits. Wedge 16 has an inwardly tapered wedge face 17 complementary to the taper of the contacting wall of tongue 15, and an opposite approximately semi-circular face 18 which snugly fits into the circular socket 13. The wedge is locked in place by means of a suitable wedge screw 19 which engages a threaded opening 19a formed in the base of the socket (see FIG. 4) which must be loosened to thereby loosen the wedge slightly and permit movement of the tongue.

The cutter head is provided with a corner recess 20 to receive a replaceable cutter insert 21 mounted upon an insert anvil or seat 22, with the insert and seat secured in the socket by means of a suitable pin-type fastener. Such insert and seat are conventional items, usually formed of a hard carbide material and arranged for removal and rotation so that each of the edges of the insert may be used for cutting, one after the other, as each is worn, following which the insert may be replaced altogether with a new insert. Although a triangular shaped insert is shown, the particular shape is not relevant to the invention herein.

Figure 5:
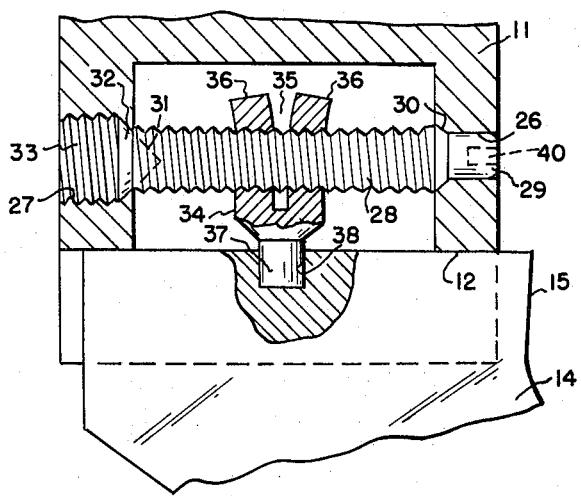
FIGURE 5 is an enlarged, cross-sectional view of the boring tool.
Figure 6:
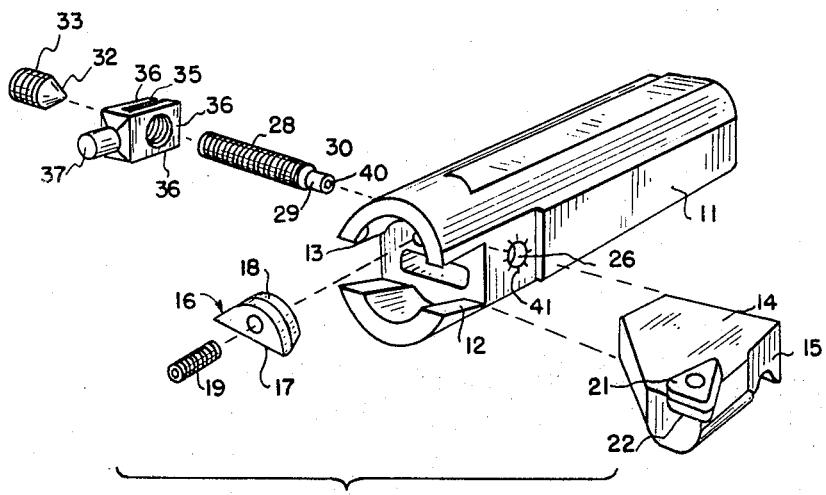
FIGURE 6 is an exploded, perspective view of the boring tool.
Figures 7, 8:
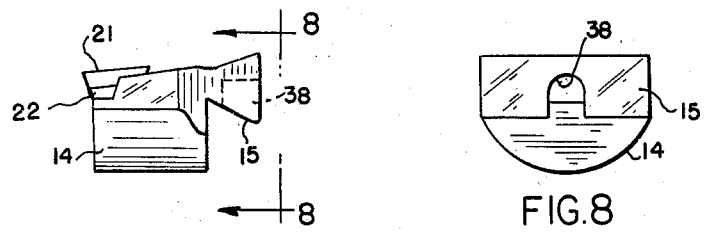
FIGURE 7 is a side elevational view of the cutter head, per se.
FIGURE 8 is a rear end view of the cutter head taken in the direction of arrows 8—8 of FIG. 7.

In order to move the cutter head transversely of the end of the bar, a precision adjustment means is provided. For this purpose, as most clearly shown in FIGS. 4 and 5, an elongated slot or hole 25, parallel to and opening into groove 12, is formed in the end of the bar. A small, round opening 26 extends from one side of the bar into one end wall of the hole. Diametrically opposite opening 26, a larger, threaded opening 27 extends through the bar into the opposite end wall of the slot.

A precision adjusting screw 28 is arranged within the slot, with the screw having a narrowed bearing end portion 29 closely fitted within the small opening 26. The area at the juncture of the smaller end portion and the wider diameter threaded body portion of the screw forms an annular bearing shoulder 30 which bears against the end wall of the slot, that is, the portion of the hole at the junction of the larger and smaller diameter thereof.

The opposite end of the adjusting screw 28 is provided with an internal conical socket 31 which receives the corresponding conical bearing end 32 of a support screw 33 threadedly engaged within the opening 27. The adjusting screw is thereby firmly contained between opposite bearing surfaces, thus containing the screw against transverse movement.

Mounted upon the adjusting screw is a precision adjusting nut 34 which is slit at 35 to form two somewhat resilient, bowed-apart, or diverging nut halves 36 connected together and forming a stud portion 37 which is extended into a socket 38 formed in the end of the cutter head. The fit between the stud and the socket is sufficiently close so that there is not relative movement between the two, whereby movement of the nut 34 causes the cutter head to move correspondingly.

The split arrangement of the adjusting nut with the diverging halves 36 causes opposing axial forces upon the thread faces of the adjusting screw to thereby avoid any play or slop or backlash between the thread of the nut and the thread of the screw. This results in a precise movement of the nut in response to rotation of the screw.

The result of the opposite bearing surfaces containing the adjustment screw against transverse movement, the use of a slotted adjusting nut to prevent backlash and the relatively tight fit between the stud 37 and the slot 38 in the cutter head combine to provide a tool of very precise adjustment.

To effect rotation of the adjusting screw, a socket 40 for the reception of a wrench is formed in its small bearing end.

As shown in FIG. 2, indicia 41 are marked around the opening 26 and a suitable mark 42 is formed on the end of the adjusting screw.

In operation, the cutter head tongue 15 is placed within the groove 12 and then the wedge 16 is assembled in place. To adjust the cutter head, the wedge 16 is loosened slightly, by loosening its screw 19, and then a suitable wrench is inserted into the socket 40 formed in the end of the adjustment screw, which is then rotated to move the nut, in turn moving and positioning precisely the cutter head so that its insert is exactly positioned for cutting.

As an example of the precision obtainable, by using a movable adjustment screw having 40 threads per inch, the nut wall advance 25 thousandths of an inch for each full revolution of the screw. Thus, 25 marks may be formed to make up the indicia 41 so that each 25th of a turn, that is, each movement from one mark to the next mark, results in a thousandth of an inch advance of the nut.

Since backlash is eliminated for all practical purposes, a movement of one thousandth of an inch of the nut correspondingly moves the cutter head one thousandth of an inch. Once the cutter head is properly located, the wedge as again tightened by tightening its screw 19. The combination of the wedge and the dovetail fit at the opposite portion of the groove forms a secure and yet simple positioning of the cutter head in place.

In the event of wear or damage or need for a replacement of a different adjustment screw having a different thread pitch, the conical support screw 33 may be easily removed, thereby permitting removal of the adjustment screw through that opening.

Despite its ease of removal, the adjustment screw is accurately supported on its central axis by the conical bearing surface 31 of the screw 33 and the shoulder 30 and the surface of the bearing portion 26.

This invention may be further developed within the scope of the following claims. Accordingly, it is desired that the foregoing description be read as being merely illustrative of an operative embodiment of this invention, and not in a strictly limited sense.

I claim:

1. An adjustable boring tool comprising
    a boring bar shank having a transverse open-ended groove formed in one end thereof, a cutter head arranged against the bar end and having a tongue slidably mounted within the groove for sliding movement transversely along the length of the groove,
    a transverse hole formed in the bar end parallel to and connected by an opening with the groove, one end of said hole being of reduced diameter,
    a threaded adjusting screw rotatably mounted within the hole with a first end of the screw mounted at the end of the hole of reduced diameter and exposed at said end at the side of the bar for adjustment thereof,
    the surface of the hole at the juncture of the larger and smaller diameter portions thereof forming an annular bearing shoulder arranged in bearing contact with the first end of the adjusting screw,
    the opposite end of the adjusting screw being rotatably supported upon a bearing element for rotation of the screw, the two opposite bearing surfaces for the adjustment screw together acting to contain the adjustment screw against transverse movement,
    a nut threadably mounted upon the adjusting screw with a portion thereof extending into the groove and engaged with the head, said nut being slit transversely of screw axis to form two nut portions joined together at the nut portion which extends into the groove, the two nut portions being slightly divergent to thereby exert opposing axially directed forces upon the threads of the adjusting screw for precisely positioning the nut relative to the adjusting screw,
    whereby rotation of the adjusting screw moves the nut along the axis of the threaded screw to thereby transversely adjust and hold the cutting head relative to the bar end.

2. An adjustable boring tool as defined in claim 1, in which the opposite end of the adjusting screw is rotatably supported upon a bearing element comprising a screw having a conically pointed end threadedly engaged within a threaded opening formed in the side of the bar, with the conical pointed end fitted into a correspondingly conically pointed socket formed in the end of said adjusting screw.

3. An adjustable boring tool as defined in claim 1 and including a releasable wedge means fitted into the groove between the tongue and one wall of the groove for tightly locking the head relative to the bar end.

4. An adjustable cutting tool comprising a shank having a transverse open-ended groove at one end thereof having two transverse walls, a first one of which is tapered inwardly toward the open end of the groove,
    a cutter head adjustably mounted on said shank having a tongue extending transversely therefrom from the end opposite the cutting end, the tongue having a first wall tapered complementary to and in contact with the inwardly tapered wall of the groove, and a second wall adjacent a second wall of the groove tapered convergingly with respect to the first tapered wall,
    the shank having a socket opening into the groove adjacent the second wall thereof,
    a wedge member inserted within said socket, said wedge member being shaped complementary to the walls of said socket and the converging taper of the cutter head tongue and fitted within the socket, adjustment means for adjusting the position of the cutter head transversely on the shank, and means for drawing the wedge into the socket to thereby lock the tongue and cutter head by dovetail fit against movement on the shank.

References Cited

UNITED STATES PATENTS

| | | | |
|---|---|---|---|
| 1,468,827 | 9/1923 | Morris | 77—58 |
| 2,358,741 | 9/1944 | Shelby | 77—58 |
| 2,489,719 | 11/1949 | Myers | 77—58 |
| 2,937,432 | 5/1960 | Novkov | 29—96 |
| 3,324,529 | 6/1967 | McCreery | 29—96 |

GERALD A. DOST, Primary Examiner

U.S. Cl. X.R.

29—96